US007669756B2

(12) United States Patent
Uchida et al.

(10) Patent No.: US 7,669,756 B2
(45) Date of Patent: Mar. 2, 2010

(54) METHOD FOR SURVEYING FISHERY SOURCES AND DEVICE FOR EFFECTING SUCH METHOD

(75) Inventors: Keiichi Uchida, Yokosuka (JP); Yoshinori Miyamoto, Tokyo (JP); Toshiharu Kakihara, Yokohama (JP)

(73) Assignee: Tokyo University of Marine Science and Technology, Tokyo (JP)

( * ) Notice: Subject to any disclaimer, the term of this patent is extended or adjusted under 35 U.S.C. 154(b) by 764 days.

(21) Appl. No.: 10/589,351

(22) PCT Filed: Feb. 23, 2005

(86) PCT No.: PCT/JP2005/002883

§ 371 (c)(1),
(2), (4) Date: Aug. 11, 2006

(87) PCT Pub. No.: WO2005/082138

PCT Pub. Date: Sep. 9, 2005

(65) Prior Publication Data

US 2007/0192148 A1 Aug. 16, 2007

(30) Foreign Application Priority Data

Mar. 1, 2004 (JP) ............................. 2004-055828
Nov. 9, 2004 (JP) ............................. 2004-324511

(51) Int. Cl.
*G06K 17/00* (2006.01)
*G06K 15/00* (2006.01)

(52) U.S. Cl. ..................................... 235/375; 235/383

(58) Field of Classification Search ................. 235/375, 235/492, 493, 486, 383; 340/572.8, 573.3
See application file for complete search history.

(56) References Cited

U.S. PATENT DOCUMENTS

| 2,268,463 | A | * | 12/1941 | Schafer | 242/260 |
| 2,683,893 | A | * | 7/1954 | Baader | 452/154 |
| 6,286,460 | B1 | * | 9/2001 | Gudbjornsson | 119/200 |
| 2007/0188331 | A1 | * | 8/2007 | Kumagai et al. | 340/572.8 |
| 2007/0192148 | A1 | * | 8/2007 | Uchida et al. | 705/7 |
| 2007/0228140 | A1 | * | 10/2007 | Kumagai et al. | 235/375 |

\* cited by examiner

*Primary Examiner*—Thien M Le
(74) *Attorney, Agent, or Firm*—Oliff & Berridge, PLC (57) ABSTRACT

Survey of fishery resources is automatically effected by providing an identification element (i.e. IC tag) to each fishing gear, locating a plurality of such fishing gears under the sea to catch fishery resources, thereafter, using a reading device (e.g. tag reader) to read all the identification elements to obtain an identification data for each of the fishing gears, while obtaining an operating position in this survey by GPS device, and then counting number of fish catches for each of the fishing gears. All the data thus obtained are processed by a computer, so that a data of fishery resources distribution under the sea can be obtained automatically, without requiring much labor and expenses in conducting the survey. A device for effecting such method is also provided.

10 Claims, 4 Drawing Sheets

METHOD FOR SURVEYING FISHERY SOURCES AND DEVICE FOR EFFECTING SUCH METHOD

FIELD OF THE INVENTION

The present invention relates to a method of fishery resources survey, which allows for easily and automatically conducting a survey on distribution of fishing effort amount in the waters or sea (i.e. a survey on location of individual fishing gear in the sea) with respect to fishery resources living under the sea, and also for conducting a survey on the number of fish catches. The invention also relates to a device for effecting such fishery resources survey method. In this regard, the term, "fishery resources survey", refers to execution of survey on any information and data required for a fishery of the type controlled for resource management which is intended for recovering fishery resources and enabling continued use of the fishery sources.

BACKGROUND ARTS

Recently, in the field of marine industry, there has been an increasing demand for controlled fishing manner which can properly control fishery resources and allows continued use of the fishery resources (i.e. the so-called fisheries controlled for resource management). In order to promote such fisheries controlled for resource management, it is very essential to pursue the following points: estimation of an amount of resources which is on a decreasing trend; and precise determination and control of a fishing effort amount and other factors which undesirably exceed an amount of fishery resources.

DISCLOSURE OF THE INVENTION

Problems to be Solved by the Invention

Nowadays, conducting a survey of the foregoing basic fishery information and data requires and relies on a great ratio of manual operations made by survey members and so forth, including cooperation from fishery operators' side, not to mention. Ideally, such survey should be effected continually or intermittently throughout the year, which however involves some limitations, taking into account actual costs for labors and chartering ships.

It is a purpose of the present invention to provide a fishery resources survey method and a device for effecting the method, which are improved in precision and eliminate the above-stated problems by developing and incorporating a system including an integrated circuit tag (hereinafter, "IC tag") and GPS (global positioning system) in combination, the IC tag and GPS having been rapidly reduced in size and price in recent years, so as to automate survey processes on fishery sites which have hitherto required a considerable amount of persons' labors.

Means for Solving the Problems

A method for surveying fishery resources in accordance with the present invention is characterized by comprising: a first step of obtaining an operating position data by means of GPS in conjunction with a time data corresponding to a point of time when the operating position data is obtained; a second step of obtaining an identification data given in an identification means provided to each of a plurality of fishing gears, in conjunction with a time data corresponding to a point of time when the identification data is obtained; a third step of executing processing for the operating position data and the time data corresponding to the point of time when the operating position data is obtained, and also executing processing for the identification data and the time data corresponding to the point of time when the identification data is obtained, so as to find a match between the time data associated with the operating position data and the time data associated with the identification data, thereby determining a particular operating position data and a particular identification data, both of which correspond to each other in terms of the time data; a fourth step of counting number of fishes and marine lives caught in or by such each of the plurality of fishing gears which are withdrawn from sea so as to obtain a fish-catch-number data with respect to the foregoing each of the plurality of fishing gears, and thereafter, associating the fish-catch-number data with the identification data given in the identification means of such each of the plurally of fishing gears for which the fish-catch-number data has been obtained, so as to obtain a particular fish-catch-number data; and a fifth step of executing processing for the particular operating position data and the particular identification data as well as for the particular fish-catch-number data and the identification data given in the identification means of the foregoing each of the plurality of fishing gears for which the fish-catch-number data has been obtained, so as to find a match between the particular identification data and the identification data, and determining a definite operating position data and a definite fish-catch-number data, both of which correspond to each other in terms of the identification data.

With regard to the foregoing first step, the time data may be selected from one of the following time data types: a time data to be outputted on the basis of a time data sent from space satellites; a time data outputted from a clock device built in the computer; a time data to be outputted on the basis of a time information sent from a broadcast which announces clock time; and an ordinary clock. But, of those clock devices, from the viewpoint of precise time information, it is preferable to use the time data to be outputted on the basis of a time data sent from space satellites. It is noted that the term, "operating position", refers to one or both of the following positions: a position of ship on the sea (hereinafter, "ship position"), wherein the ship conducts a fishery resources survey and/or fishing operation; and a position of fishing gears disposed under the sea (hereinafter, "fishing gear disposition point")

With regard to the foregoing second step, the recommended examples of the fishing gears for use in the present invention are: a tubular conger trap(s) adapted to catch conger(s) therein; an octopus trap(s) of a pot type; a cage-type crab trap(s) adapted to catch crabs therein; a cage-type trap(s) adapted to catch prawns and shrimps therein; and a longline-type fishing gear for longline fishing operation, which is typically formed by one main line and a plurality of fishing gears securely attached to and along that main line. The afore-said identification means provided to the fishing gears are each capable of storing an identification data on each of the fishing gears and may be a bar-code element(s) for instance, but, a more preferred mode thereof is an IC tag(s) in terms of its long durability and it's easy operation for reading relevant identification data as well as of its ability to store a large amount of data in memory.

With regard to that second step, it may be arranged that, prior to the plurality of fishing gears being cast into the sea, the identification data is obtained from the identification means of each of said plurality of fishing gears, thereby providing a non-cast fishing gear identification data. In that case, at the foregoing third step, a processing is executed for the non-cast fishing gear identification data and a time data corresponding to the point of time when such non-cast fishing gear identification data is obtained, so as to find a match between the time data associated with the operating position data and the time data associated with the non-cast fishing gear identification data, thereby determining a particular operating position data and a particular non-cast fishing gear identification data, both of which correspond to each other in terms of the time data.

Also, with regard to the second step, it may be arranged that, the plurality of fishing gears, which have been cast into and disposed under the sea, are withdrawn in sequence from the sea and loaded onto a ship, and then, the identification data is obtained from the identification means of each of the thus-withdrawn plurality of fishing gears, thereby providing a withdrawn fishing gear identification data.

In such case, at the third step, the withdrawn fishing gear identification data and the time data corresponding to the point of time when such withdrawn fishing gear identification data is obtained may be processed so as to find a match between the time data associated with the operating position data and the time data associated with the withdrawn fishing gear identification data, within a predetermined interval of time between one and another withdrawn fishing gears, thereby determining a particular operating position data and a particular withdrawn fishing gear identification data, both of which correspond to each other in terms of the time data. It is noted here that the foregoing predetermined interval of time is a certain period of time which is required for one of the withdrawn fishing gears to be displaced to the fish catch counter, subsequent to the reading device having read the identification means of such withdrawn fishing gear, and also required for the fish catch counter to complete counting the number of fish catches associated with that particular withdrawn fishing gear.

In the case where the operating position refers to the aforesaid fishing gear disposition point only, the first step may consist of obtaining a fishing gear disposition point data by means of GPS in conjunction with a time data corresponding to a point of time when the fishing gear disposition point data is obtained, and thus, the third step may consist of executing processing for the fishing gear disposition point data and the time data corresponding to the point of time when the fishing gear disposition point data is obtained. In that case, at that third step, processing is executed to find a match between the time data associated with the fishing gear disposition point data and the time data associated with the identification data. Hence, at the fifth step, processing is executed to determine a definite fishing gear disposition point data and a definite fish-catch-number data, both of which correspond to each other in terms of the identification data.

In this connection, the present fishery resources survey method may be arranged such that a time when the plurality of fishing gears are disposed under the sea is obtained from: the non-cast fishing gear identification data in the identification means of the plurality of fishing gears as well as a time data corresponding to a point of time when the non-cast fishing gear identification data is obtained; and the withdrawn fishing gear identification data in the identification means of the plurality of fishing gears as well as a time data corresponding to a point of time when the withdrawn fishing gear identification data is obtained.

A device for surveying fishery resources in accordance with the present invention is characterized by comprising: a GPS device for obtaining an operating position data; a clock device for outputting time data; a plurality of fishing gears; a plurality of identification means which are respectively provided to the plurality of fishing gears; a reading device for reading an identification data in each of the plurality of identification means; a fish catch counter for counting number of fish catches associated with fishes and marine lives caught in or by each of the plurality of fishing gears so as to provide a fish-catch-number data for the each of the plurality fishing gears; a computer for executing processing for data and information which are obtained from the GPS device, the clock device, the reading device and the fish catch counter; and an output device for outputting a data which is created by the processing of the computer, wherein the computer comprises: a fishing gear data storage portion for storing the identification data obtained by the reading device in conjunction with the time data outputted from the clock device; a first fish catch data storage portion for storing the fish-catch-number data obtained by the fish catch counter, in conjunction with the time data outputted from the clock device; an operating position data storage portion for storing an operating position data obtained from the GPS device, in conjunction with the time data outputted from the clock device; a fish catch data arithmetical operation part for determining a definite identification data and a definite fish-catch-number data with respect to the each of the plurality of fishing gears, on basis of the identification data and the time data which are both stored in the fishing gear data storage area, and also on basis of the fish-catch-number data and the time data which are both stored in the first fish catch data storage portion; a second fish catch data storage portion for storing the thus-obtained definite identification data and definite fish-catch-number data which are both associated with the each of the plurality of fishing gears; a fishing gear position data arithmetical operation part for determining a definite identification data and a definite fishing gear position data with respect to the each of the plurality of fishing gears, on basis of the operating position data and the time data which are both stored in the operating position data storage portion, and also on basis of the identification data and the time data which are both stored in the fishing gear data storage portion; a fishing gear position data storage portion for storing the definite identification data and the definite fishing gear position data which are both obtained by the fishing gear position arithmetical operation part; a fishery resources distribution data arithmetical operation part for determining and obtaining a data on relation between the number of fish catches and a position of fishing ground, on basis of the definite identification data and the definite fish-catch-number data which are both stored in the second fish catch data storage portion, and also on basis of the definite identification data and the definite fish-catch-number data which are both stored in the fishing gear position data storage portion; and a fishery resources distribution data storage portion for storing the data on relation between the number of fish catches and the position of fishing ground, which has been obtained by the fishery resources distribution data arithmetical operation part.

In this context, the clock device may be selected from one of the following types: a clock device of the type which includes a receiver designed to receive a time data sent from space satellites and operates to output the time data; a clock device built in the computer; a clock device of the type which includes a receiver designed to receive a broadcast announcing clock time and operates to output a time data; and an ordinary clock. But, of those clock devices, from the viewpoint of precise time information, it is preferable to use the clock device of the type which includes a receiver designed to receive a time data transmitted from space satellites and operates to output the time data.

With regard to the fishing gears, the recommended examples thereof for use in the present invention are: a tubular conger trap(s) adapted to catch conger(s) therein; an octopus trap(s) of a pot type; a cage-type crab trap(s) adapted to catch crabs therein; a cage-type trap(s) adapted to catch prawns and shrimps therein; and a longline-type fishing gear for longline fishing operation, which is typically formed by one main line and a plurality of fishing gears securely attached to and along that main line.

The identification marks or means provided to the fishing gears may be a bar-code element(s), but, a more preferred mode thereof is the IC tag(s) stated above in terms of its long durability and it's easy operation for reading relevant identification data as well as of its ability to store a large amount of data in memory.

As the output device, may be used one of the following devices: a CRT, an LCD monitor, other monitor similar thereto, and a printer.

The fishing gear position data arithmetical operation part determines a match between the time data associated with the data on the position of ship and the time data associated with the identification data. Then, the thus-matched two pieces of data are selected and respectively processed by the arithmetical operation part as a definite fishing gear position data and a definite identification data. Such two definitely matched pieces of data are stored in the fishing gear position data storage portion.

The fish catch data arithmetical operation part determines a match between the time data associated with the identification data and the time data associated with the fish-catch-number data, within a predetermined interval of time between one and another withdrawn fishing gears. Then, the thus-matched two pieces of data are selected and respectively processed by the arithmetical operation part as a definite fishing gear position data and a definite identification data. Such two definitely matched pieces of data are transmitted to the second fish catch data storage portion.

The afore-said predetermined interval of time is a certain period of time which is required for one of the withdrawn fishing gears to be displaced to the fish catch counter, subsequent to the reading device having read the identification means of such withdrawn fishing gear, and also required for the fish catch counter to complete counting the number of fish catches associated with that particular withdrawn fishing gear.

The fishery resources distribution data arithmetical operation part determines a match between a particular identification data associated with the fishing gear position data and a particular identification data associated with the fish-catch-number data. Then, the thus-matched two pieces of data are selected and respectively processed by the arithmetical operation part as a definite identification data and a definite fish-catch-number data, both of which are exactly associated with a corresponding one of the withdrawn fishing gears. Thereafter, such two definitely matched pieces of data are transmitted to the fishery resources distribution data storage portion.

As one aspect of the present invention, the plurality of fishing gears, which have been disposed under sea and are withdrawn from the sea, may be provided as a plurality of withdrawn fishing gears each having said identification means in which the identification data is given, and the identification data of each of the plurality of withdrawn fishing gears may be read by the reading device. In this mode, the fishing gear data storage portion may include a withdrawn fishing gear data storage area for storing the identification data associated with each of the plurality of withdrawn fishing gears in conjunction with the time data outputted from the clock device.

As another aspect of the invention, the plurality of fishing gears, before being cast into sea, may be provided as a plurality of non-cast fishing gears each having the identification means in which the identification data is given, and the identification data of each of said plurality of non-cast fishing gears may be read by said reading device, whereas on the other hand, the plurality of fishing gears, which have been cast in sea and are withdrawn from the sea, may be provided as a plurality of withdrawn fishing gears each having the identification means in which the identification data is given, and the identification data of each of the plurality of withdrawn fishing gears be read by the reading device. In this mode, the fishing gear data storage portion may comprise: a non-cast fishing gear data storage area for storing the identification data associated with each of the plurality of non-cast fishing gears in conjunction with the time data outputted from the clock device; and a withdrawn fishing gear data storage area for storing the identification data associated with each of the plurality of withdrawn fishing gears in conjunction with the time data outputted from the clock device.

The device may comprise a fishing gear location time data arithmetical operation part operable to execute processing for the identification data associated with the each of the plurality of non-cast fishing gears, which is obtained by the reading device, as well as for one of the time data which corresponds to a point of time when the identification data associated with the afore-said each of the plurality of non-cast fishing gears is obtained, and also execute processing for the identification data associated with the afore-said each of the plurality of withdrawn fishing gears, which is obtained by the reading device, as well as for one of the time data which corresponds to a point of time when the identification data associated with the foregoing each of the plurality of withdrawn fishing gears is obtained, so as to find a match between the identification data associated with such each of the plurality of non-cast fishing gears and the identification data associated with such each of the plurality of withdrawn fishing gears, thereby obtaining two matched pieces of identification data and identifying a particular one of the plurality of fishing gears on basis of the two matched pieces of identification data, then calculates a time difference by subtracting a time data associated with one of the two matched pieces of identification data from a time data associated with another of the two matched pieces of identification data, then computes on basis of the time difference so as to obtain a fishing gear location time data which is a data on a period of time during which one particular fishing gear is located under the sea, and finally outputs the fishing gear location time data to the fishery resources distribution data storage portion, so that the fishing gear location time data is stored the fishery resources distribution data storage portion.

Effects of the Present Invention

In accordance with the fishery resources survey method and device of the present invention, it is possible to automatically survey fishery resources living under the sea, thereby enabling fishery operators to easily conduct a detailed survey of the habitat position and habitat amount of the fishery resources living under the sea, without any considerable labor being imposed to the fishery operators.

Further, in accordance with the fishery resources survey method and device of the present invention, it is possible to obtain a specific data on the position of individual fishing gear used as well as on the amount of fish catches per individual fishing gear used, and thus secure a precise understanding thereabout, which realizes a detailed survey of habitat distribution and habitat amount of the fishery resources living under the sea. This means that a small amount of fishing efforts can be properly used for a rich marine area where a great number of fishery sources live under the sea, so that, for instance, fishery operators can secure a required number of fish catches therefrom, without excessive catches. Thus, with the specific data obtained by the present invention, it is possible to effect an appropriate control of fishery resources living under the sea.

Furthermore, in accordance with the fishery resources survey method and device of the present invention, it is possible to obtain a specific data on a position of individual fishing gear as well as on the amount of fish caught per individual fishing gear and thus secure a precise understanding thereabout, which realizes a detailed survey of habitat distribution and habitat amount of the fishery resources living under the sea. This means that a desired amount of fishery resources can be caught by a small number of fishing gears for a short period of time. Hence, it is possible to reduce labor and investments on the side of fishery operators.

BEST MODE FOR CARRYING OUT THE
PRESENT INVENTION

Figure 1:
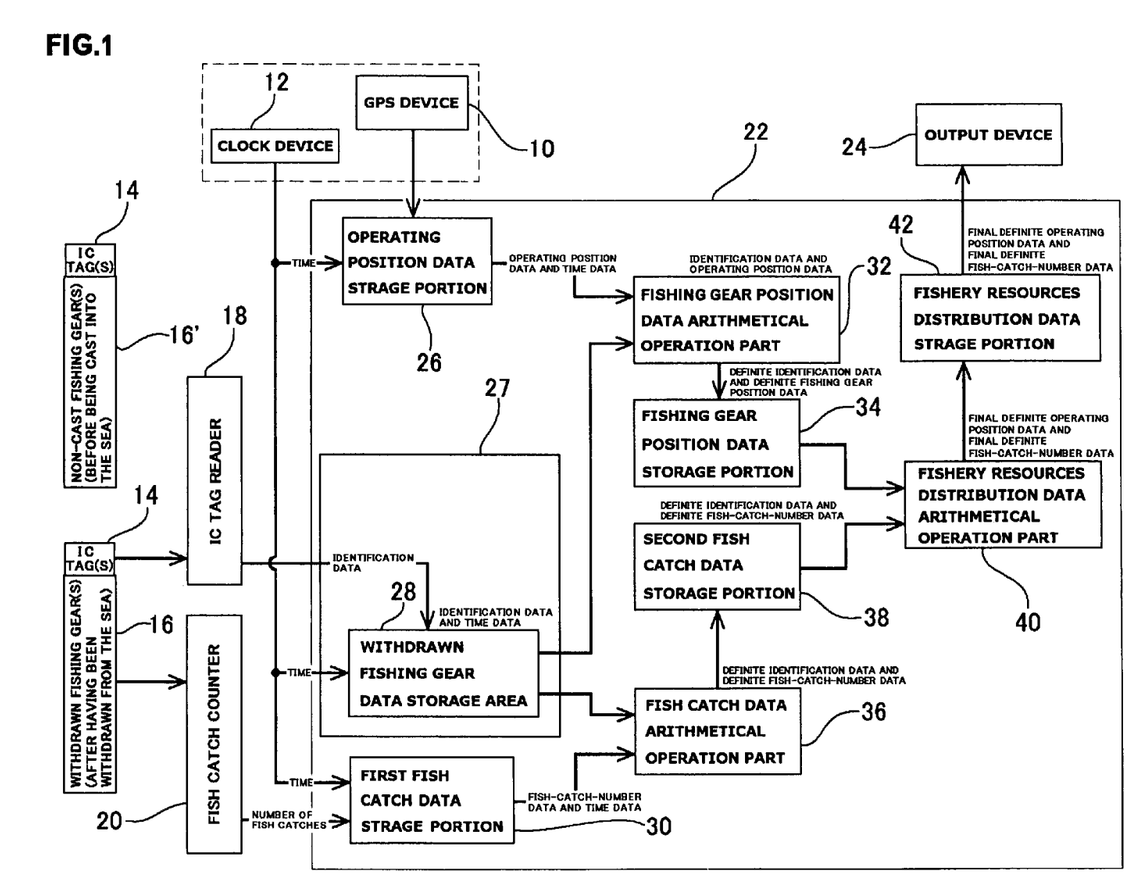
FIG. 1: A block flow diagram which explanatorily illustrates the structure and operation of a first embodiment of fishery resources survey device in accordance with the present invention.

FIG. 1 is a block flow diagram for showing the structure and operations of a first embodiment of device for surveying fishery resources in accordance with the present invention.

As shown, the fishery resources survey device of the present invention is basically comprised of: a GPS device 10 operable to search and determine an operating position in the sea so as to output an operating position data; a clock device 12 for outputting time data; a plurality of IC tags (or plurality of identification marks or means) 14; a plurality of fishing gears 16; a tag reader (or a reading device for reading an identification mark or means) 18 which is operable to read an identification data given in each of the IC tags which are each attached to the corresponding one of the fishing gears 16 that have been withdrawn from the sea; a fish catch counter 20 for counting number of fish catches (i.e. number of fishes and marine lives caught by the fishing gears 16 withdrawn from the sea); a computer 22 operable to execute processing for information and data which are obtained by the foregoing GPS device 10, clock device 12, tag reader 18 and fish catch counter 20; and an output device 24 for outputting data created by such processing of the computer 22.

It is noted here that the clock device 12 may be selected from one of the following types: a clock device of the type which includes a receiver designed to receive a time data sent from space satellites and operates to output the time data; a clock device built in the computer 22; a clock device of the type which includes a receiver designed to receive a broadcast announcing clock time and operates to output a time data; and an ordinary clock. But, of those clock devices, from the viewpoint of precise time information, it is preferable to use the clock device of the type which includes a receiver designed to receive a time data transmitted from space satellites and operates to output the time data. It is also noted that the term, "operating position", refers to one or both of the following positions: a position of ship on the sea (hereinafter, "a ship position"), wherein the ship conducts a fishery resources survey and/or fishing operation; and a position where the fishing gear(s) is/are located under the sea (hereafter, "fishing gear location position").

With regard to the fishing gears 16, the recommended examples thereof for use in the present invention are: a tubular conger trap(s) adapted to catch conger(s) therein; an octopus trap(s) of a pot type; a cage-type crab trap(s) adapted to catch crabs therein; a cage-type trap(s) adapted to catch prawns and shrimps therein; and a longline-type fishing gear for longline fishing operation, which is typically formed by one main line and a plurality of fishing gears securely attached to and along that main line.

The afore-said identification marks or means provided to the fishing gears 16 may be a bar-code element(s), but, a more preferred mode thereof is the IC tag(s) stated above in terms of its long durability and it's easy operation for reading relevant identification data as well as of its ability to store a large amount of data in memory.

As the output device 24, may be used one of the following devices: a CRT, an LCD monitor; any other monitor or display similar thereto, and a printer.

The computer 22 in the present invention is basically comprised of: an operating position data storage portion 26; a withdrawn fishing gear data storage area 28: a first fish catch data storage portion 30; a fishing gear position data arithmetical operation part 32; a fishing gear position data storage portion 34; a fish catch data arithmetical operation part 36; a second fish catch data storage portion 38; a fishery resources distribution data arithmetical operation part 40; and a fishery resources distribution data storage portion 42. It is noted that, in the annexed drawings, a block and a designation 27 pointed thereto are shown, which refers to a "fishing gear data storage portion" in a generic manner, which may comprise the withdrawn fishing gear data storage area 28 and/or a non-cast fishing gear data storage area 44, as will be described later.

The operating position data storage portion 26 is so arranged as to store the above-defined operating position data obtained by the GPS device 10, in conjunction with a time data being outputted from the clock device 12.

The withdrawn fishing gear data storage portion 28 is so arranged as to store each identification data obtained by the tag reader 18, in conjunction with a time data being outputted from the clock device 120, wherein the identification data is associated with each IC tag securely attached to a fishing gear 16 that has been withdrawn from the sea. Hereinafter, such fishing gear 16 shall be referred to as "withdrawn fishing gear".

The first fish catch data storage portion 30 is so arranged as to store a data on the afore-said number of fish catches obtained by the fish catch counter 20, in conjunction with a time data being outputted from the clock device 12. Hereinafter, such data on the number of fish catches shall be referred to as "fish-catch-number data".

The fishing gear position data arithmetical operation part 32 is operable to execute processing for plural pieces of the afore-said operating position data and time data which are both stored in the operating position data storage portion 26, and also execute processing for plural pieces of the afore-said identification data and time data which are both stored in the withdrawn fishing gear data storage area 28. Namely, out of such plural pieces of data, the arithmetical operation part 32 operates to find a match between a particular identification data and a particular operating position data in terms of the time data. In other words, the arithmetical operation part 32 determines a match between a particular time data associated with the operating position data and a particular time data associated with the identification data. Then, the thus-matched two pieces of data are selected and respectively processed by the arithmetical operation part 32 as a definite identification data and a definite fishing gear position data, both of which are exactly associated with a corresponding one of the withdrawn fishing gears 16. Such two definitely matched pieces of data are outputted.

The fishing gear position data storage portion 34 is so arranged as to store the foregoing two definitely matched pieced of data outputted from the fishing gear position data arithmetic operation part 32, wherein the two pieces of data are, again, the definite identification data and definite fishing gear position data, both of which are exactly associated with a corresponding one of the withdrawn fishing gears 16.

The fish catch data arithmetical operation part 36 is operable to execute processing for plural pieces of the afore-said identification data and time data which are both stored in the withdrawn fishing gear data storage area 28, and also execute processing for plural pieces of the afore-said fish-catch-number data and time data which are both stored in the first fish catch data storage area 30. Namely, out of such plural pieces of data, the arithmetical operation part 36 operates to find a match between a particular identification data and a particular fish-catch-number data in terms of the time data, within a predetermined interval of time given between one and another withdrawn fishing gears 16 which are being subjected to the present processing in sequence. In other words, the arithmetical operation part 36 determines a match between a particular time data associated with the identification data and particular time data associated with the fish-catch-number data, within such predetermined interval of time. Then, the thus-matched two pieces of data are selected and respectively processed by the arithmetical operation part 36 as a definite identification data and a definite fish-catch-number data, both of which are exactly associated with a corresponding one of the withdrawn fishing gears 16. Such two definitely matched pieces of data are outputted and stored in the second fish catch data storage area 38.

In this context, it is to be noted that the afore-said predetermined interval of time is a certain period of time which is required for one of the withdrawn fishing gears 16 to be displaced to the fish catch counter 20, subsequent to the tag reader 18 having read an IC tag 14 of such withdrawn fishing gear 16 and also required for the fish catch counter 20 to complete counting the number of fish catches associated with that particular withdrawn fishing gear.

The second fish catch data storage portion 38 is so arranged as to store the foregoing two definitely matched pieced of data obtained by the fish catch data arithmetic operation part 36, wherein such pieces of data are, again, the definite identification data and definite fish-catch-number data, both of which are exactly associated with a corresponding one of the withdrawn fishing gears 16).

The fishery resources distribution data arithmetical operation part 40 is operable to execute processing for plural pieces of the afore-said definite identification data and definite fishing gear position data which are both associated with the corresponding withdrawn fishing gear 16 and stored in the fishing gear position data portion 34, and also execute processing for plural pieces of the afore-said definite identification data and definite fish-catch-number data which are both associated with the corresponding withdrawn fishing gear 16 and stored in the second fish catch data storage portion 38. Namely, out of such plural pieces of data, the arithmetical operation part 40 operates to find a match between the definite fishing gear position data and the definite fish-catch-number data in terms of the identification data. In other words, the arithmetical operation part 40 determines a match between the identification data associated with the fishing gear position data and the identification data associated with the fish-catch-number data. Then, the thus-matched two pieces of data are selected and respectively processed by the arithmetical operation part 40 as a final definite operating position data and a final definite fish-catch-number data, both of which are exactly associated with a corresponding one of the withdrawn fishing gears 16. Then, such two finally matched pieces of data are outputted. Here, it is to be understood that the arithmetical operation part 40 processes the definite fishing gear position data in a format identical to the previously defined operating position data so as to provide a final definite operating position that can be used as a definite ship position data or a definite fishing gear position, as may be required in surveying the fishery resources distribution.

The fishery resources distribution data storage portion 42 is so arranged as to store the foregoing two finally matched pieced of data obtained by the fishery resources distribution data arithmetical operation part 40, wherein such pieces of data are, again, the final definite operating position data and the final definite fish-catch-number data, both of which are exactly associated with a corresponding one of the withdrawn fishing gears 16).

Hereinafter, a description will be made of operation of the foregoing fishery resources survey device.

First of all, the GPS device 10 is operated in conjunction with a time data being outputted from the clock device 12 so as to determine and record the previously defined operating position in accordance with passage of time. Then, the thus-obtained operating position data and time data are stored in the operating position data storage portion 26.

Next, a plurality of the fishing gears 16, each having the respective IC tags 14 securely attached thereto, are cast from the ship into the sea and disposed at proper points under the sea.

After lapse of a predetermined period of time from the forgoing casting operation, the plurality of fishing gears 16 are withdrawn in sequence from the respective points where they have been disposed in the sea, and loaded onto the ship.

Thereafter, each of the IC tags 14 provided to the respective fishing gears 16 is read by the tag reader 18 to obtain an identification data associated with each of the fishing gears 16, and then, each identification data thus obtained is stored in the withdrawn fishing gear data storage area 28 in conjunction with a time data outputted at that time from the clock device 12.

Next, the fishing gear position data arithmetical operation part 32 executes processing for plural pieces of the operating position data and time data which are both stored in the operating position data storage portion 26 as stated above, and also executes processing for plural pieces of the identification data and time data which are both stored in the withdrawn fishing gear storage area 28 as stated above. Namely, out of such plural pieces of data, the arithmetical operation part 32 operates to find a match between a particular operating position data and a particular identification data in terms of the time data. In other words, the arithmetical operation part 32 determines a match between a particular time data associated with the operating position data and a particular time data associated with the identification data. Then, the thus-matched two pieces of data are selected and respectively processed by the arithmetical operation part 32 as a definite fishing gear position data and a definite identification data, both of which are exactly associated with a corresponding one of the withdrawn fishing gears 16 which was actually disposed under the sea. Such two definitely matched pieces of data are outputted and stored in the fishing gear position data storage portion 34. Likewise, other remaining plural pieces of data, which are stored in the operating position data storage portion 26 and the withdrawn fishing gear data storage area 28, are subjected to the above-described processing in sequence and outputted.

Thereafter, the number of fishes and marine lives caught in or by the fishing gears 16 are counted by the fish catch counter 20, and then, a data of the number of fish catches thus counted (hereinafter, a fish-catch-number data) is stored in the first fish catch data storage portion 30 in conjunction with time data being outputted from the clock device 12.

Next, the fish catch data arithmetical operation part 36 executes processing for plural pieces of the identification data and time data which are both stored in the withdrawn fishing gear data storage area 28 as stated above, and also executes processing for plural pieces of the fish-catch-number data and time data which are both stored in the first fish catch data storage area 30 as stated above. Namely, out of such plural pieces of data, the arithmetical operation part 36 operates to find a match between a particular identification data and a particular fish-catch-number data in terms of the time data, within a predetermined interval of time given between one and another withdrawn fishing gears 16 which are being subjected to the present processing in sequence. In other words, the arithmetical operation part 36 determines a match between a particular time data associated with the identification data and particular time data associated with the fish-catch-number data, within such predetermined interval of time. Then, the thus-matched two pieces of data are selected and respectively processed by the arithmetical operation part 36 as a definite identification data and a definite fish-catch-number data, both of which are exactly associated with a corresponding one of the withdrawn fishing gears 16. Such two definitely matched pieces of data are outputted and stored in the second fish catch data storage portion 38. Likewise, other remaining plural pieces of data, which are stored in the withdrawn fishing gear data storage area 28 and the first fish catch data storage area 30, are subjected to the above-described processing in sequence and outputted.

In this context, it is to be noted that the afore-said predetermined interval of time is a certain period of time which is required for one of the withdrawn fishing gears 16 to be displaced to the fish catch counter 20, subsequent to the tag reader 18 having read an IC tag 14 of such withdrawn fishing gear 16 and also required for the fish catch counter 20 to complete counting the number of fish catches associated with that particular withdrawn fishing gear.

Next, the fishery resources distribution data arithmetical operation part 40 executes processing for plural pieces of the previously stated definite fishing gear position data and definite identification data, both of which are stored in the fishing gear position data storage portion 34, and also executes processing for plural pieces of the previously stated definite fish-catch-number data and definite identification data which are both stored in the second fish catch data storage portion 38. Namely, out of such plural pieces of data, the arithmetical operation part 40 operates to find a match between the definite fishing gear position data and the definite fish-catch-number data, in terms of the identification data. In other words, the arithmetical operation part 40 determines a match between the identification data associated with the fishing gear position data and the identification data associated with the fish-catch-number data. Then, the thus-matched two pieces of data are selected and respectively processed by the arithmetic portion 40 as a final definite operating position data and a final definite fish-catch-number data, both of which are exactly associated with a corresponding one of the withdrawn fishing gears 16. Thereafter, such two definitely matched pieces of data are outputted and stored in the fishery resources distribution data storage portion 42. Here, it is to be understood that the arithmetical operation part 40 processes the definite fishing gear position data in a format identical to the previously defined operating position data so as to provide a final definite operating position that can be used as a definite ship position data or a definite fishing gear position, as may be required in surveying the fishery resources distribution. Likewise, other remaining plural pieces of data, which are stored in the fishing gear position data portion 34 and the second fish catch data storage portion 38, are subjected to the above-described processing in sequence and outputted. With this processing, it is possible to obtain a precise data on the relation between the number of fish catches and a position (s) of fishing ground where the fishing gears 16 are used.

In addition to the foregoing matched pieces of operating position data and fish-catch-number data, other remaining matched pieces of such operating position data and fish-catch-number data are stored in the fishery resources distribution data storage area 42 in the above-described way, and any desired pieces of data may be selected from the thus-stored pieces of data and outputted via the output device 24.

Figure 2:
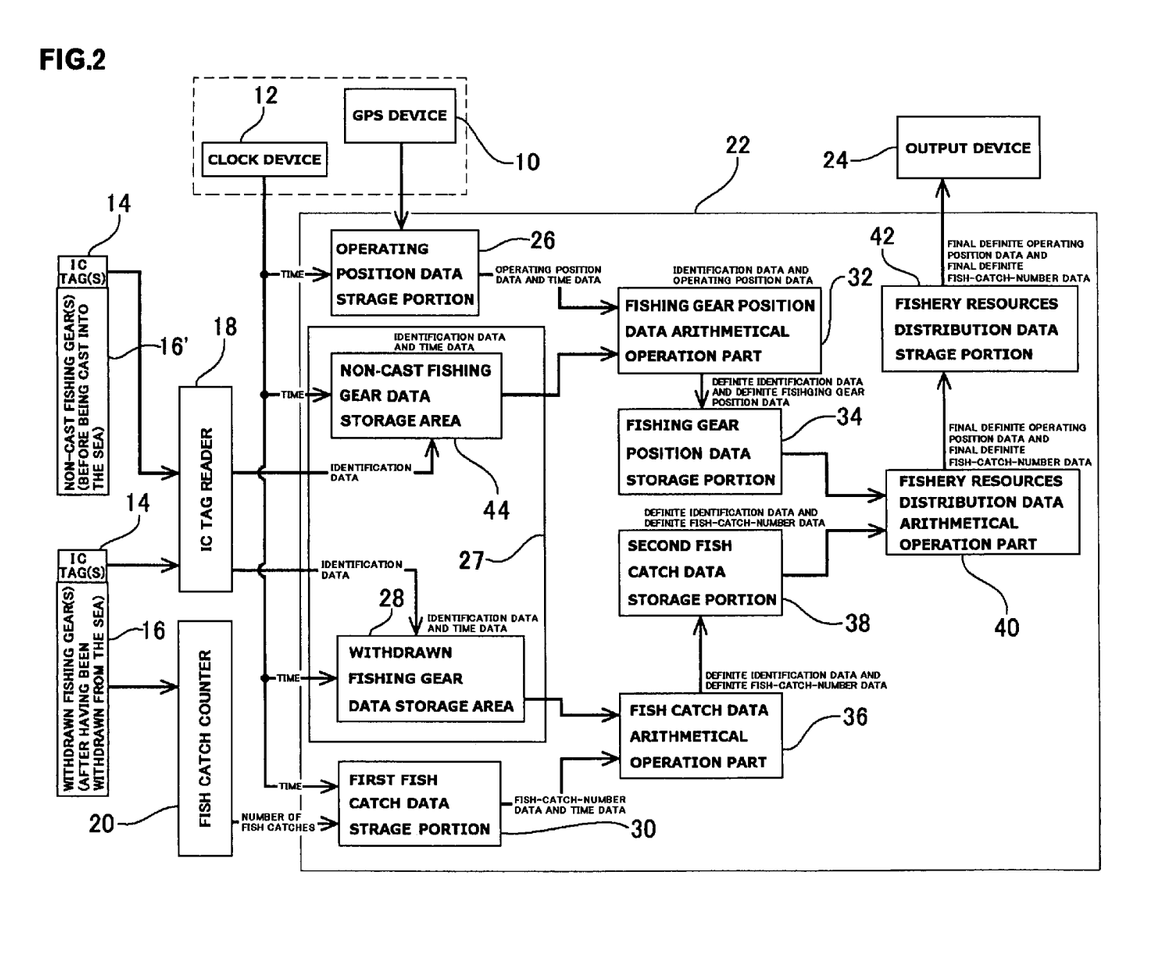
FIG. 2: A block flow diagram which explanatorily illustrates the structure and operation of a second embodiment of fishery resources survey device in accordance with the present invention.

FIG. 2 is a block flow diagram for showing the structure and operation of a second embodiment of fishery resources survey device in accordance with the present invention. The structure and operation of this second embodiment are basically identical to those of the above-described first embodiment, but different therefrom in the points to be described blow. It is therefore noted that any further description is omitted as to common elements and operations between the first and second embodiments, and that all like designations to be given hereinafter correspond to all like designations that have been used in the first embodiment.

According to the present second embodiment, it is arranged that, prior to the fishing gears 16 being cast into the sea, the tag reader 18 will read each identification mark or means (i.e. IC tag 14) provided to the respective non-cast fishing gears 16', in addition to reading the identification mark or means (i.e. IC tag 14) of the withdrawn fishing gears 16 which are withdrawn from the sea. For that purpose, in the second embodiment, the fishing gear data storage portion 27 in the computer 22 includes additional fishing gear data storage area 44 for storing each identification data obtained by the tag reader 18 with regard to the corresponding identification mark or means (i.e. IC tag 14) prior to the associated fishing gear 16' being cast into the sea. Hereinafter, this storage area 44 shall be referred to as "non-cast fishing gear data storage area". Hence, in this embodiment, before casting the fishing gears 16' into the sea, each of the IC tags 14 secured to the corresponding one of non-cast fishing gears 16' is read by the tag reader 18 to obtain an identification data associated with each of that non-cast fishing gears 16', and then, each identification data so obtained is stored in the foregoing non-cast fishing gear data storage area 44 in conjunction with a time data being outputted from the clock device 12.

Subsequent thereto, the fishing gear position data arithmetical operation part 32 executes processing for plural pieces of the operating position data and time data which are both stored in the foregoing operating position data storage portion 26, and also executes processing for each of the identification data and time data which are both stored in the foregoing non-cast fishing gear data storage area 44. Namely, out of such plural pieces of data, the arithmetic portion 32 operates to find a match between a particular identification data and a particular operating position data in terms of the time data. In other words, the arithmetical operation part 32 determines a match between a particular time data associated with the operating position data and a particular time data associated with the identification data. Then, the thus-matched two pieces of data are selected and respectively processed by the arithmetical operation part 32 as a definite fishing gear position data and a definite identification data, both of which are exactly associated with a corresponding one of the non-cast fishing gears 16'. Such two definitely matched pieces of data are outputted. Likewise, other remaining plural pieces of data, which are stored in the operating position data storage portion 26 and the non-cast fishing gear data storage area 28, are subjected to the above-described processing in sequence and outputted.

Figure 3:
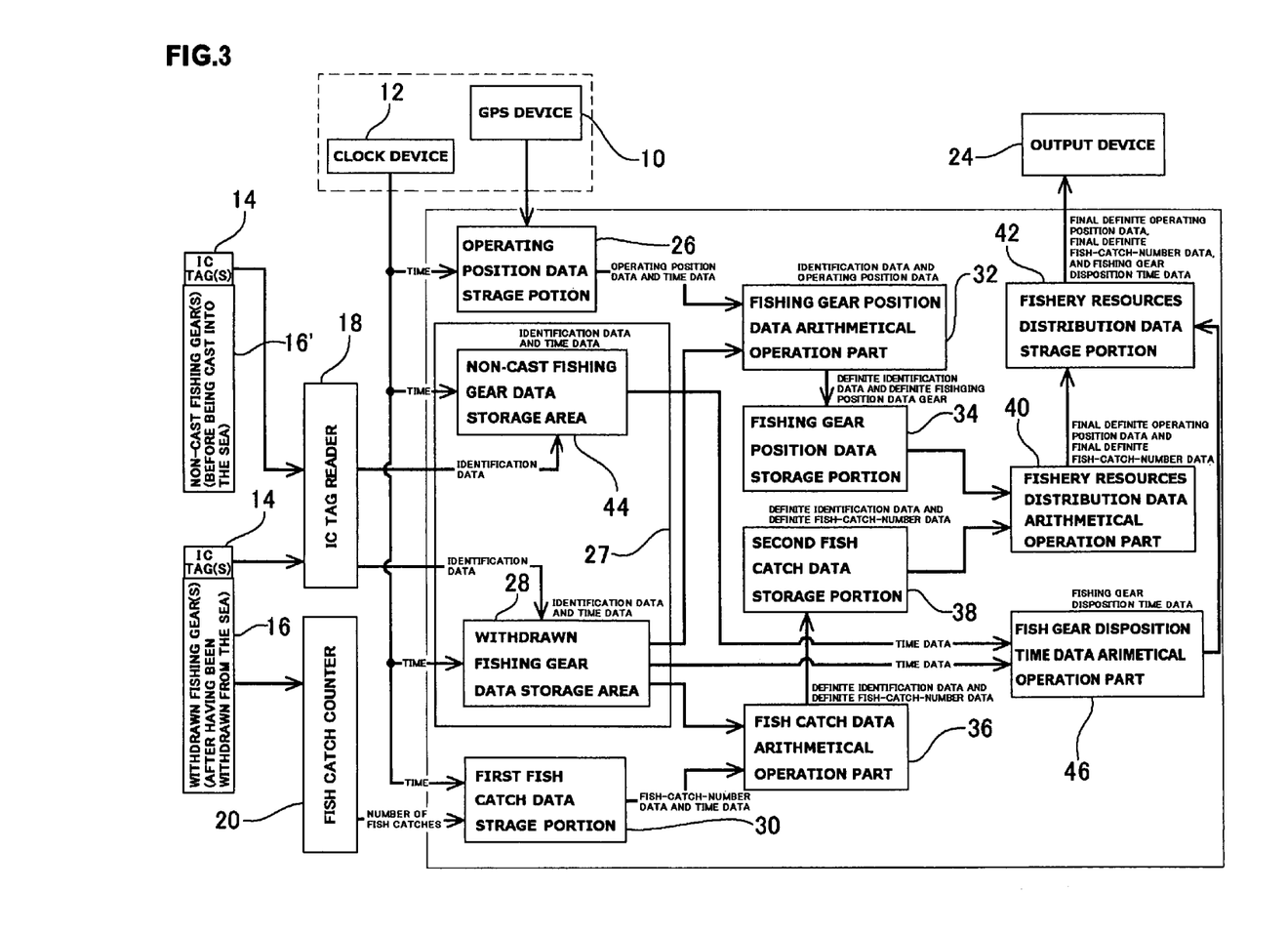
FIG. 3: A block flow diagram which explanatorily illustrates the structure and operation of a third embodiment of fishery resources survey device in accordance with the present invention.

FIG. 3 is a block flow diagram for showing the structure and operation of a third embodiment of fishery resources survey device in accordance with the present invention. The structure and operation of this third embodiment are basically identical to those of the above-described first embodiment, but only different therefrom in the points to be described blow. It is therefore noted that any further description is omitted as to common elements and operations between the third and first embodiments, and that all like designations to be given hereinafter correspond to all like designations that have been used in the first embodiment.

The present third embodiment is arranged such that, prior to the fishing gears 16' being cast into the sea, the tag reader 18 will read each identification mark or means (i.e. IC tag 14) provided to the respective one of the non-cast fishing gears 16' so as to obtain a non-cast fishing gear identification data, in addition to reading the identification mark or means (i.e. IC tag 14) of the withdrawn fishing gears 16 which are withdrawn from the sea so as to obtain a withdrawn fishing gear identification data. For that purpose, in this third embodiment, the computer 22 is provided with a non-cast fishing gear data storage area 44 in the fishing gear data storage portion 27, which is so arranged as to store the non-cast fishing gear identification data and a time data in association with non-cast fishing gears, and also provided with a fishing gear disposition time data arithmetical operation part 46 for determining a time period during which the fishing gears are disposed under the sea.

The non-cast fishing gear data storage area 44 stores each non-cast fishing gear identification data obtained by the tag reader 18 with regard to the corresponding identification mark or means (i.e. IC tag 14) in conjunction with a time data being outputted from the clock device 12, prior to the associated fishing gear 16' being cast into the sea. In other words, before casting the fishing gears 16' into the sea, each of the IC tags 14 provided to the corresponding one of non-cast fishing gears 16' is read by the tag reader 18 to obtain a non-cast fishing gear identification data associated with each of the non-cast fishing gears 16', and then, each non-cast fishing gear identification data so obtained is stored in the foregoing non-cast fishing gear data storage area 44 in conjunction with a time data being outputted from the clock device 12.

The fishing gear disposition time data arithmetical operation part 46 executes processing for plural pieces of the foregoing non-cast fishing gear identification data and time data which are both stored in the non-cast fishing gear data storage area 44, and also executes processing for plural pieces of the foregoing withdrawn fishing gear identification data and time data which are both stored in the withdrawn fishing gear data storage area 28. Namely, out of such plural pieces of data, the arithmetical operation part 46 operates to find a match between a particular identification data associated with a particular one of the non-cast fishing gears 16' and a particular identification data associated with a particular one of the withdrawn fishing gears 16, thereby obtaining two matched pieces of identification data and identifying one particular fishing gear on the basis of such two matched pieces of identification data, and then calculates a time difference by subtracting a time data (i.e. a time) associated with one of the two matched pieces of identification data from a time data (i.e. a time) associated with another of the two matched pieces of identification data. Based on the thus-obtained time difference, the arithmetical operation part 46 computes to obtain a data on a time period during which one particular fishing gear (16) has been disposed under the sea. Hereinafter, such time data shall be referred to as "fishing gear disposition time data". The thus-obtained fishing gear disposition time data is transmitted to the foregoing fishery resources distribution data storage portion 42 and stored in memory therein.

Figure 4:
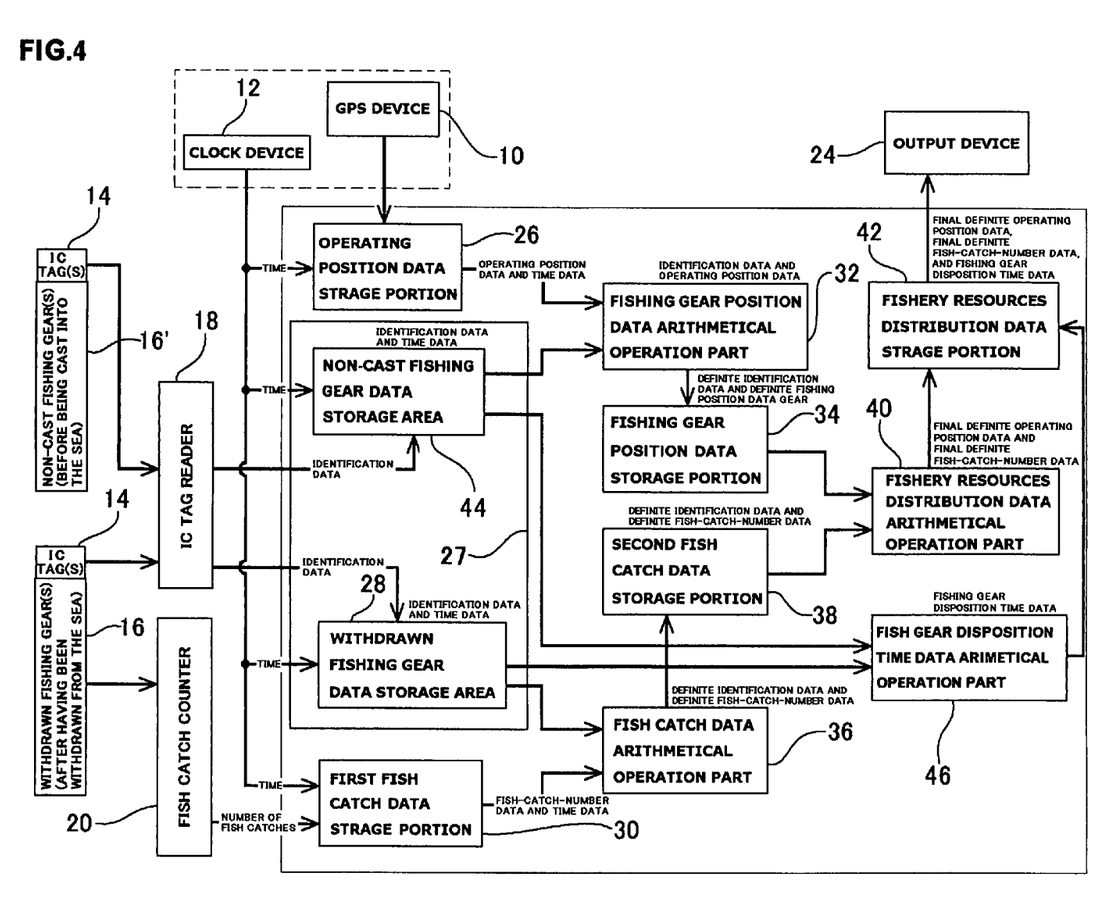
FIG. 4: A block flow diagram which explanatorily illustrates the structure and operation of a fourth embodiment of fishery resources survey device in accordance with the present invention.

FIG. 4 is a block flow diagram for showing the structure and operation of a fourth embodiment of fishery resources survey device in accordance with the present invention. The structure and operation of this fourth embodiment are basically identical to those of the above-described second embodiment, only except that the fourth embodiment includes a fishing gear disposition time data arithmetical operation part 46 in the device of the second embodiment, as will be described below. It is therefore noted that any further description is omitted as to common elements and operations between the forth and second embodiments, and that all like designations to be given hereinafter correspond to all like designations that have been used in the second embodiment as well as in the first embodiment.

According to the present fourth embodiment, a fishing gear disposition time data arithmetical operation part 46 is provided, which executes processing for plural pieces of the foregoing non-cast fishing gear identification data and time data which are both stored in the non-cast fishing gear data storage area 44, and also executes processing for plural pieces of the foregoing withdrawn fishing gear identification data and time data which are both stored in the withdrawn fishing gear data storage area 28. Namely, out of such plural pieces of data, the arithmetical operation part 46 operates to find a match between a particular identification data associated with a particular one of the non-cast fishing gears 16' and a particular identification data associated with a particular one of the withdrawn fishing gears 16, thereby obtaining two matched pieces of identification data and identifying one particular fishing gear on the basis of such two matched pieces of identification data, and then calculates a time difference by subtracting a time data (i.e. a time) associated with one of the two matched pieces of identification data from a time data (i.e. a time) associated with another of the two matched pieces of identification data. Based on the thus-obtained time difference, the arithmetic portion 46 computes to obtain a data on a time period during which one particular fishing gear (16) has been disposed under the sea. Hereinafter, such time data shall be referred to as "fishing gear disposition time data". The thus-obtained fishing gear disposition time data is transmitted to the foregoing fishery resources distribution data storage portion 42 and stored in memory therein.

It should be understood that the fishery resources survey method and device for effecting the same in accordance with the present invention are not limited to the above-described and illustrated embodiments, but any other modification, replacement and addition may be applied thereto without departing from the gist of the present invention and scopes of the appended claims.

In addition to the above-described constituent elements, the fishery resources survey method and device of the present invention may further include a data logger provided to each fishing gear, though not shown, such that a specific data on conditions and environments under the sea (such as seawater temperature, dissolved oxygen, salt content, turbidity, and depth) are measured and recorded by the data logger in a direct relation with the fishing gear (or fishes or marine lives caught by the fishing gears) and in accordance with passage of time as well. Hereinafter, such specific data on conditions and environments under the sea shall be referred to as "undersea condition/environment data". It is noted that the fishing gear(s) in this mode refers to the above-mentioned fishing gears 16.

In the case where the foregoing data logger is provided to the fishing gear, each of the data loggers may be securely attached to the respective one of all the fishing gears used, or be securely attached to the respective one of a predetermined number of the fishing gears which are selected from all the fishing gears. (The fishing gear may be a tubular conger trap, octopus trap of pot type, and so forth.) In this instance, the fishing gears, with the data loggers secured respectively thereto, are cast and disposed properly in the sea, so that each of the data loggers in the sea effects analysis and measurement of conditions and environments of seawater in accordance with passage of time, thereby providing a time-based undersea condition/environment data (e.g. seawater temperature, dissolved oxygen, salt content, turbidity, and depth and so forth.), and that the thus-obtained data are recorded in a recorder portion of the data logger.

Thereafter, the fishing gears as well as the data loggers are withdrawn from the sea, and then, each individual identification data given in the IC tag provided to each of the fishing gears is read out by the IC tag reader. On the other hand, all pieces of data on position of the corresponding fishing gear (hereinafter, such data on position of the corresponding fishing gear shall be referred to as "fishing gear position data".) have been stored in a storage portion of computer or PC (wherein such storage portion of computer stores an operating position data and a time data, as similar to the previously described operating position data storage portion 26 which is shown in all FIGS. 1 to 4). Next, the thus-read-out individual identification data as well as all pieces of the foregoing fishing gear position data are stored in the storage portion are properly processed by the computer so as to obtain an individual position data on each of the fishing gears used. Further, a data reading device is used to read the data loggers provided to the respective fishing gears so as to obtain therefrom an individual data on the conditions and environments of the sea in which a particular one of the fishing gears is disposed. Such individual data on the conditions and environments of the sea shall be referred to as "individual undersea condition/environment data", hereinafter.

Based upon the foregoing individual fishing gear position data and individual undersea condition/environment data, a processing is executed to obtain a time-based undersea condition/environment data at a particular limited point under the sea, so that a data on the conditions and environment of a particular limited undersea point in which a particular one of the fishing gears is disposed is obtained in accordance with passage of time. Then, likewise, another time-based undersea condition/environment data is obtained at another limited undersea point, until plural different pieces of the time-based undersea condition/environment data are obtained at their respective different limited undersea points, Simultaneous therewith, at such respective different limited undersea points, plural pieces of the previously mentioned fish-catch-number data are also obtained. Thereafter, with a proper data processing, the thus-obtained plural pieces of time-based undersea condition/environment data and the thus-obtained plural pieces of fish-catch-number data are associated with one another in order and compiled into an aggregate data, after which, such aggregate data is analyzed to determine a specific relation between a fishery resources distribution and a condition and environment under the sea.

It is noted that each of the foregoing data loggers includes: a sensor element for analyzing and measuring the condition and environment in the sea so as to provide an undersea condition/environment data; a clock element; and a recorder element for recording the undersea condition/environment data sent from the sensor element in accordance with passage of time in conjunction with the clock element. It is also noted that each of the identification data, which is given in an IC tag provided to a corresponding fishing gear as previously stated, should be associated with a corresponding data logger provided to that particular fishing gear, prior to the fishing gears being cast into the sea. In other words, it is essentially arranged that each of the different data loggers are associated with the respective different IC tags, in advance, thereby allowing each of the data loggers to recognize an IC tag associated therewith as well as an identification data given therein, and thus identify a pertinent fishing gear from other fishing gears, which is exactly provided with that particular associated IC tag.

From the undersea condition/environment data obtained by the data logger, it is possible to determine a point where each of the fishing gears has been cast into the sea, by finding a prominently changed part of the seawater temperature data, which is indicative of a greatly changed degree of seawater temperature. This is because, at the point of time when the fishing logger is cast into the sea, an ambient temperature being measured by the data logger provided to the fishing logger is abruptly changed and decreased due to a low degree of seawater temperature, and therefore, the data logger records such greatly changed part of seawater temperature data.

Hence, in the present invention, it is possible to use the fishing gears (or marine lives caught by the fishing gears) and effect a direct analysis and measurement in association with each of the fishing gears with respect to conditions and environment under the sea (such as seawater temperature, dissolved oxygen, salt content, turbidity, and depth) in accordance with passage of time. This allows for determination of a direct relation between marine lives including fishes and their living conditions, as well as determination of a direct relation between a fishery resources distribution and an undersea conditions and environment. Accordingly, it is effectively possible with the present invention to realize an appropriate control of fishing effort amount.

INDUSTRIAL APPLICABILITY OF THE INVENTION

The above-described method and device for surveying fishery resources in accordance with the present invention makes it possible for fishery operators to easily and automatically survey the positions and number of fishery resources living under the sea, without considerable labor imposed to the fishery operators.

DESCRIPTION OF DESIGNATIONS IN THE DRAWINGS

10 GPS device
12 Clock device
14 IC tag
18 Fishing gear
20 Fish catch counter
22 Computer
24 Output device
26 Operating position data storage portion
27 Fishing gear data storage portion
28 Withdrawn Fishing gear data storage area
30 First fish catch data storage portion
32 Fishing gear position data arithmetical operation part
34 Fishing gear position data storage portion
36 Fish catch data arithmetical operation part
38 Second fish catch data storage portion
40 Fishery resources distribution data arithmetical operation part
42 Fishery resources distribution data storage portion
44 Non-cast fishing gear data storage area
46 Fishing gear disposition time data arithmetical operation part

The invention claimed is:

1. A method for surveying fishery resources, comprising:
a first step of obtaining an operating position data by means of GPS in conjunction with a time data corresponding to a point of time when said operating position data is obtained;
a second step of obtaining an identification data given in an identification means which is provided to each of a plurality of fishing gears, in conjunction with a time data corresponding to a point of time when said identification data is obtained;
a third step of executing processing for said operating position data and said time data corresponding to said point of time when the operating position data is obtained, and also executing processing for said identification data and said time data corresponding to said point of time when said identification data is obtained, so as to find a match between said time data associated with said operating position data and said time data associated with said identification data, thereby determining a particular operating position data and a particular identification data, both of which correspond to each other in terms of said time data;
a fourth step of counting number of fishes and marine lives caught in or by said each of said plurality of fishing gears which are withdrawn from sea so as to obtain a fish-catch-number data with respect to said each of said plurality of fishing gears, and thereafter, associating said fish-catch-number data with said identification data given in said identification means of said each of said plurality of fishing gears for which said fish-catch-number data has been obtained, so as to obtain a particular fish-catch-number data; and
a fifth step of executing processing for said particular operation position data and said particular identification data as well as for said particular fish-catch-number data and said identification data given in said identification means of said each of said plurality of fishing gears for which said fish-catch-number data has been obtained, so as to find a match between said particular identification data and said identification data, and determining a definite operating position data and a definite fish-catch-number data, both of which correspond to each other in terms of said identification data.

2. The method for surveying fishery resources as claimed in claim 1, wherein at said fourth step, said plurality of fishing gears, which have been cast into and disposed under the sea, are withdrawn in sequence from the sea and loaded onto a ship, and then, said identification data is obtained from said identification means of said each of said plurality of fishing gears thus withdrawn from the sea, thereby providing a withdrawn fishing gear identification data.

3. The method of surveying fishery resources as claimed in claim 1, wherein prior to said plurality of fishing gears being cast into the sea, said identification data is obtained from said identification means of said each of said plurality of fishing gears, thereby providing a non-cast fishing gear identification data.

4. The method for surveying fishery resources as claimed in claim 3, wherein a time when said each of said plurality of fishing gears is located under the sea is obtained from:
said non-cast fishing gear identification data in said identification means of said each of said plurality of fishing gears as well as a time data corresponding to a point of time when said non-cast fishing gear identification data is obtained; and
said withdrawn fishing gear identification data in said identification means of said each of said plurality of fishing gears as well as a time data corresponding to a point of time when said withdrawn fishing gear identification data is obtained.

5. A device for surveying fishery resources, comprising:
a GPS device for obtaining an operating position data;
a clock device for outputting time data;
a plurality of fishing gears;
a plurality of identification means which are respectively provided to said plurality of fishing gears;
a reading device for reading an identification data in each of said plurality of identification means;
a fish catch counter for counting number of fish catches associated with fishes and marine lives caught in or by each of said plurality of fishing gears so as to provide a fish-catch-number data for said each of said plurality fishing gears;
a computer for executing processing for data and information which are obtained from said GPS device, said clock device, said reading device and said fish catch counter; and
an output device for outputting a data which is created by said processing of said computer,
wherein said computer comprises:
a fishing gear data storage portion for storing said definite identification data obtained by said reading device in conjunction with said time data outputted from said clock device;
a first fish catch data storage portion for storing said fish-catch-number data obtained by said fish catch counter, in conjunction with said time data outputted from said clock device;

an operating position data storage portion for storing an operating position data obtained from said GPS device, in conjunction with said time data outputted from said clock device;

a fish catch data arithmetical operation part for determining a definite identification data and a definite fish-catch-number data with respect to said each of said plurality of fishing gears, on basis of said identification data and said time data which are both stored in said fishing gear data storage area, and also on basis of said fish-catch-number data and said time data which are both stored in said first fish catch data storage portion;

a second fish catch data storage portion for storing the thus-obtained definite identification data and definite fish-catch-number data which are both associated with said each of said plurality of fishing gears;

a fishing gear position data arithmetical operation part for determining a definite identification data and a definite fishing gear position data with respect to said each of said plurality of fishing gears, on basis of said operating position data and said time data which are both stored in said operating position data storage portion, and also on basis of said identification data and said time data which are both stored in said fishing gear data storage portion;

a fishing gear position data storage portion for storing said define definite identification data and said definite fishing gear position data which are both obtained by said fishing gear position arithmetical operation part;

a fishery resources distribution data arithmetical operation part for determining and obtaining a data on relation between said number of fish catches and a position of fishing ground, on basis of said definite identification data and said definite fish-catch-number data which are both stored in said second fish catch data storage portion, and also on basis of said definite identification data and said definite fish-catch-number data which are both stored in said fishing gear position data storage portion; and a fishery resources distribution data storage portion for storing said data on relation between said number of fish catches and said position of fishing ground, which has been obtained by said fishery resources distribution data arithmetical operation part.

6. The device for surveying fishery resources as claimed in claim 5, wherein:

said plurality of fishing gears, which have been disposed under sea and are withdrawn from the sea, are provided as a plurality of withdrawn fishing gears each having said identification means in which said identification data is given, said identification data of each of said plurality of withdrawn fishing gears is read by said reading device, and said fishing gear data storage portion comprises a withdrawn fishing gear data storage area for storing said identification data associated with each of said plurality of withdrawn fishing gears in conjunction with said time data outputted from said clock device.

7. The device for surveying fishery resources as claimed in claim 5, wherein:

said plurality of fishing gears, before being cast into sea, are provided as a plurality of non-cast fishing gears each having said identification means in which said identification data is given, said identification data of each of said plurality of non-cast fishing gears is read and obtained by said reading device, said plurality of fishing gears, which have been cast in sea and are withdrawn from the sea, are provided as a plurality of withdrawn fishing gears each having said identification means in which said identification data is given, said identification data of each of said plurality of withdrawn fishing gears is read and obtained by said reading device, and said fishing gear data storage portion includes a non-cast fishing gear data storage area for storing said identification data associated with each of said plurality of non-cast fishing gears in conjunction with said time data outputted from said clock device; and a withdrawn fishing gear data storage area for storing said identification data associated with each of said plurality of withdrawn fishing gears in conjunction with said time data outputted from said clock device.

8. The device for surveying fishery resources as claimed in claim 6, further comprising:

a fishing gear disposition time data arithmetical operation part operable to execute processing for said identification data associated with said each of said plurality of non-cast fishing gears, which is obtained by said reading device, as well as for one of said time data which corresponds to a point of time when said identification data associated with said each of said plurality of non-cast fishing gears is obtained, and also execute processing for said identification data associated with said each of said plurality of withdrawn fishing gears, which is obtained by said reading device, as well as for one of said time data which corresponds to a point of time when said identification data associated with said each of said plurality of withdrawn fishing gears is obtained, so as to find a match between said identification data associated with said each of said plurality of non-cast fishing gears and said identification data associated with said each of said plurality of withdrawn fishing gears, thereby obtaining two matched pieces of identification data and identifying a particular one of said plurality of fishing gears on basis of said two matched pieces of identification data, then calculates a time difference by subtracting a time data associated with one of the two matched pieces of identification data from a time data associated with another of the two matched pieces of identification data, then computes on basis of said time difference so as to obtain a fishing gear disposition time data which is a data on a period of time during which one particular fishing gear is located under the sea, and finally outputs said fishing gear disposition time data to said fishery resources distribution data storage portion, so that said fishing gear disposition time data is stored said fishery resources distribution data storage portion.

9. The method for surveying fishery resources as claimed in claim 3, wherein a time when said each of said plurality of fishing gears is located under the sea is obtained from:

said non-cast fishing gear identification data in said identification means of said each of said plurality of fishing gears as well as a time data corresponding to a point of time when said non-cast fishing gear identification data is obtained; and said withdrawn fishing gear identification data in said identification means of said each of said plurality of fishing gears as well as a time data corresponding to a point of time when said withdrawn fishing gear identification data is obtained.

10. The device for surveying fishery resources as claimed in claim 7, further comprising:

a fishing gear disposition time data arithmetical operation part operable to execute processing for said identification data associated with said each of said plurality of non-cast fishing gears, which is obtained by said reading device, as well as for one of said time data which corresponds to a point of time when said identification data associated with said each of said plurality of non-cast fishing gears is obtained, and also execute processing for said identification data associated with said each of said plurality of withdrawn fishing gears, which is obtained by said reading device, as well as for one of said time data which corresponds to a point of time when said identification data associated with said each of said plurality of withdrawn fishing gears is obtained, so as to find a match between said identification data associated with said each of said plurality of non-cast fishing gears and said identification data associated with said each of said plurality of withdrawn fishing gears, thereby obtaining two matched pieces of identification data and identifying a particular one of said plurality of fishing gears on basis of said two matched pieces of identification data, then calculates a time difference by subtracting a time data associated with one of the two matched pieces of identification data from a time data associated with another of the two matched pieces of identification data, then computes on basis of said time difference so as to obtain a fishing gear disposition time data which is a data on a period of time during which one particular fishing gear is located under the sea, and finally outputs said fishing gear disposition time data to said fishery resources distribution data storage portion, so that said fishing gear disposition time data is stored said fishery resources distribution data storage portion.

* * * * *